United States Patent
Roy et al.

[19]

[11] Patent Number: 6,122,819
[45] Date of Patent: Sep. 26, 2000

[54] MECHANISM FOR POSITIONING A PAIR OF HINGES ON AN AUTOMOBILE BODY

[75] Inventors: Michael Roy, Brampton; Ondrio Mazzotta, Woodbridge, both of Canada

[73] Assignee: DaimlerChrysler Corporation, Auburn Hills, Mich.

[21] Appl. No.: 09/280,950

[22] Filed: Mar. 29, 1999

[51] Int. Cl.[7] ............ G01D 21/00; B25B 27/14; B23Q 3/06; B23P 19/04

[52] U.S. Cl. ............ 29/714; 29/281.1; 29/464; 33/645; 33/600

[58] Field of Search ............ 29/11, 709, 714, 29/715, 434, 281.1, 281.5, 464; 33/600, 608, 613, 645, 533, 573

[56] References Cited

U.S. PATENT DOCUMENTS

| | | | |
|---|---|---|---|
| 3,979,817 | 9/1976 | Cheak | 29/434 |
| 4,375,716 | 3/1983 | Armstrong et al. | 29/464 |
| 4,589,184 | 5/1986 | Asano et al. | 29/430 |
| 4,619,016 | 10/1986 | Brockhaus | 16/383 |
| 4,860,424 | 8/1989 | Kaibuki et al. | 29/434 |
| 5,033,163 | 7/1991 | Kaibuki et al. | 16/386 |
| 5,095,582 | 3/1992 | Ohlsson | 16/235 |
| 5,181,307 | 1/1993 | Kitahama et al. | 29/434 |
| 5,408,785 | 4/1995 | Heim et al. | 49/502 |
| 5,564,775 | 10/1996 | Ebert et al. | 296/202 |
| 5,796,615 | 8/1998 | Madaraishi et al. | 364/468.16 |

FOREIGN PATENT DOCUMENTS 08 039 364  2/1996  Japan .

*Primary Examiner*—David P. Bryant
*Assistant Examiner*—Eric Compton
*Attorney, Agent, or Firm*—Lawrence J. Shurupoff

[57] ABSTRACT

A pair of hinges are positioned on an automotive body for fastening purposes, using a manual fixture that includes spaced pegs for locating the fixture in a desired position on the body. Three or more clamps on the fixture are controlled to clamp the fixture to the auto body automatically after the fixture has been manipulated to a desired position. Proximity switches operate the clamps at the proper time in the cycle.

6 Claims, 3 Drawing Sheets

MECHANISM FOR POSITIONING A PAIR OF HINGES ON AN AUTOMOBILE BODY

CROSS-REFERENCE TO RELATED APPLICATIONS

This application is related to co-pending U.S. patent applications, Ser. No. 09/277,900 filed on Mar. 29, 1999, entitled "Adjustable Locator Mechanism for a Hinge Positioner Fixture," Ser. No. 09/277,883 filed on Mar. 29, 1999, entitled "Precision Indexing of a Turntable Used in a Hinge-Positioner Fixture," Ser. No. 09/277,853 filed on Mar. 29, 1999, entitled "Mechanism for Removing a Hinge-Positioner Fixture from an Automobile Body," Ser. No. 09/277,884 filed on Mar. 29, 1999 entitled "Stabilizing Mechanism for a Hinge Positioner Fixture."

BACKGROUND OF THE INVENTION

1. Field of the Invention

This invention relates to a mechanism for positioning a pair of hinges on an automobile body so that the hinges can be fastened to the body in precise operating positions. The invention can be used on various types of auto bodies, e.g. passenger cars, trucks, or vans.

2. Description of Prior Developments

In the automobile production process the door hinges are sometimes installed on the automobile body while the body is in an unpainted condition on a moving conveyor. The hinges are usually installed on the auto body before the doors have been fastened to the hinges.

SUMMARY OF THE INVENTION

The present invention relates to a mechanism for positioning a pair of hinges on an auto body along one edge of a door opening so that the hinges are aligned in proper operating position before the hinges are fastened to the body.

The mechanism of the present invention includes a fixture movable to a clamped condition on the auto body, and means on the fixture for releasably holding a pair of hinges in predetermined position on the fixture, so that when the fixture is clamped to the auto body the hinges will be aligned in desired positions on the auto body. The fixture is preferably suspended from an overhead balancing device, whereby a human operator can manipulate the fixture without having to carry the entire fixture weight. The overhead balancing device allows the fixture to be moved with the automobile body while the body is being moved on a conveyor past the hinge attachment station.

The invention has a semi-automatic operational mode, such that the fixture is automatically clamped to the auto body when a human operator has been able to manipulate the fixture to a predetermined position on the auto body. The human operator can concentrate on manipulating the fixture without having to worry about using one hand to control or operate the clamping mechanism.

The means for releasably holding the door hinges on the fixture includes a magnetic mechanism for temporarily retaining the hinges on the fixture when the hinges are manually placed on the fixture, and a powered mechanism for securely holding the hinges in desired positions after the fixture has been clamped to the auto body. An aim of the invention is to free the hands of the human operator for easier manipulation of the fixture into a desired final position on the auto body.

Specific features of the invention will be apparent from the attached drawings and description of a preferred embodiment of the invention.

DESCRIPTION OF A PREFERRED EMBODIMENT OF THE INVENTION

Figure 1:
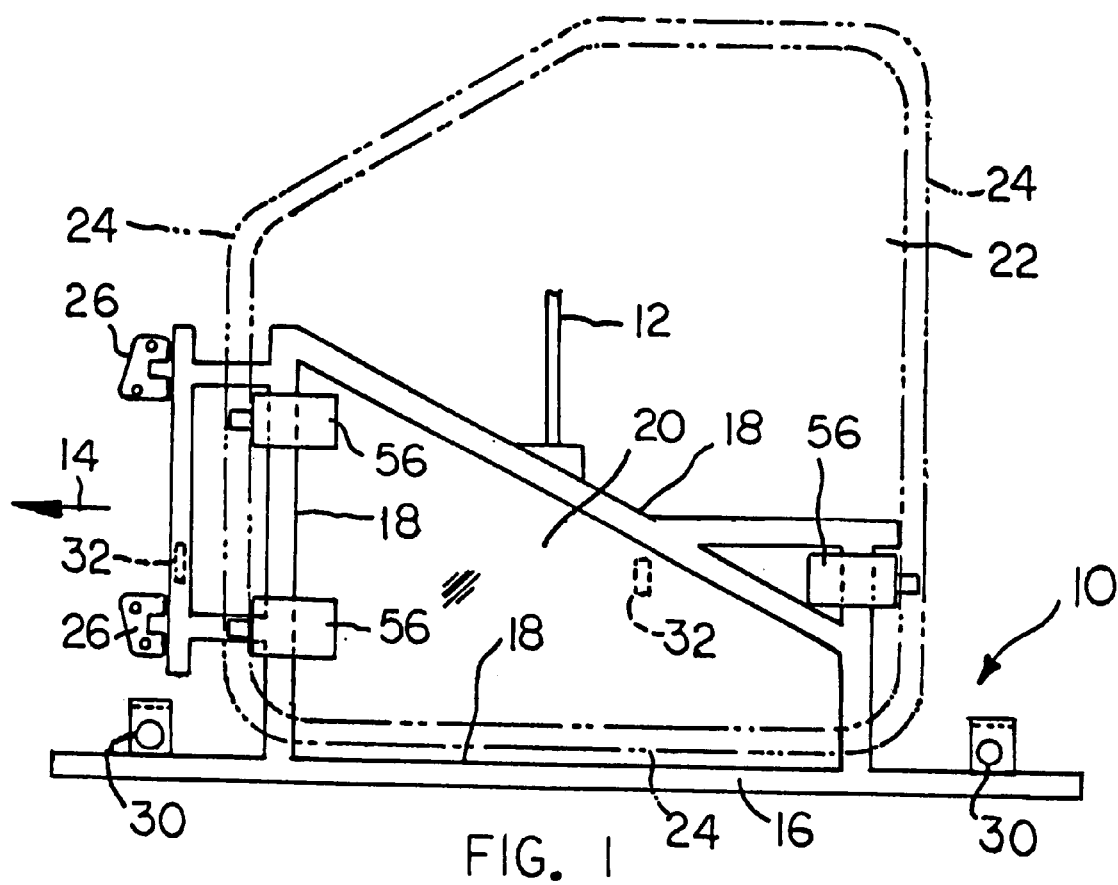
FIG. 1 is an elevational view of a hinge-positioning mechanism embodying the invention. An automobile door opening is superimposed in dashed lines on the mechanism to show the operational orientation of the mechanism relative to the automobile.

Referring to FIG. 1, there is shown a semi-automatic mechanism embodying the invention. The mechanism includes a portable fixture 10 suspended from a conventional overhead balancing device by a cable 12, whereby the fixture weight is carried by the balancing device, while permitting a human operator to move the fixture in three dimensions, i.e. into or out of the plane of the paper, up or down, and/or right and left.

Additionally, the overhead balancing device permits the fixture to be moved laterally with the automobile body, as the body is conveyed generally in the direction of arrow 14 (right-to-left in FIG. 1).

Fixture 10 includes a frame 16 formed of light weight aluminum tubes 18 suitably welded together in a uni-planar arrangement (i.e. vertically in FIG. 1). A flat panel 20 is secured to one face of frame 16 to provide support for wiring and pneumatic hoses employed in practice of the invention. Major operating components can be supported on the aluminum frame. The tubes used to form the frame are preferably formed of square cross-section tubing. Some frame elements can be formed out of aluminum bar stock.

As shown in FIG. 1, fixture 10 is positionable alongside the automobile body in facing relation to a door opening 22 defined by a peripheral flange 24 on the sheet metal portion of the body. The door opening depicted in FIG. 1 is designed to receive a front door at a subsequent point in the auto assembly process. The present invention is concerned with a mechanism for positioning two door hinges 26 on the auto body while the hinges are being fastened to the body, as by bolts or rivets (not shown). The fastening tool used for fastening the hinges is not part of the invention. FIG. 1 is taken from a point inside the automobile body, looking toward the hinge-positioning mechanism, with hinges 26 pre-located on the positioning fixture.

The invention includes two horizontally-spaced cylindrical pegs 30,30 supported by fixture 10 for insertion into pre-formed holes in the auto inner body, i.e. the body skeleton prior to placement of the fender panels and rocker panels on the skeleton. The pre-formed holes are covered by the outer rocker panel or fender panel at a later point in the manufacturing process.

Cylindrical pegs 30 are important in that they serve as locators for fixture 10 on the automobile body. The position of fixture 10 determines the position of hinges 26 on the automobile body. Placement of pegs 30,30 in the pre-formed holes in the auto body is accomplished by manual manipulation of fixture 10. Handles 32,32 on the hidden side of the fixture enable a human operator to manipulate the fixture to a desired position on the automobile body.

Prior to manipulation of fixture 10 into engagement with the auto body, the two hinges 26,26 are manually placed on a hinge positioning mechanism 34 suitably affixed to frame 16. The two hinge-positioning mechanism may be similarly constructed. A representative hinge-positioning mechanism is shown in FIGS. 2 and 3.

Figure 2:
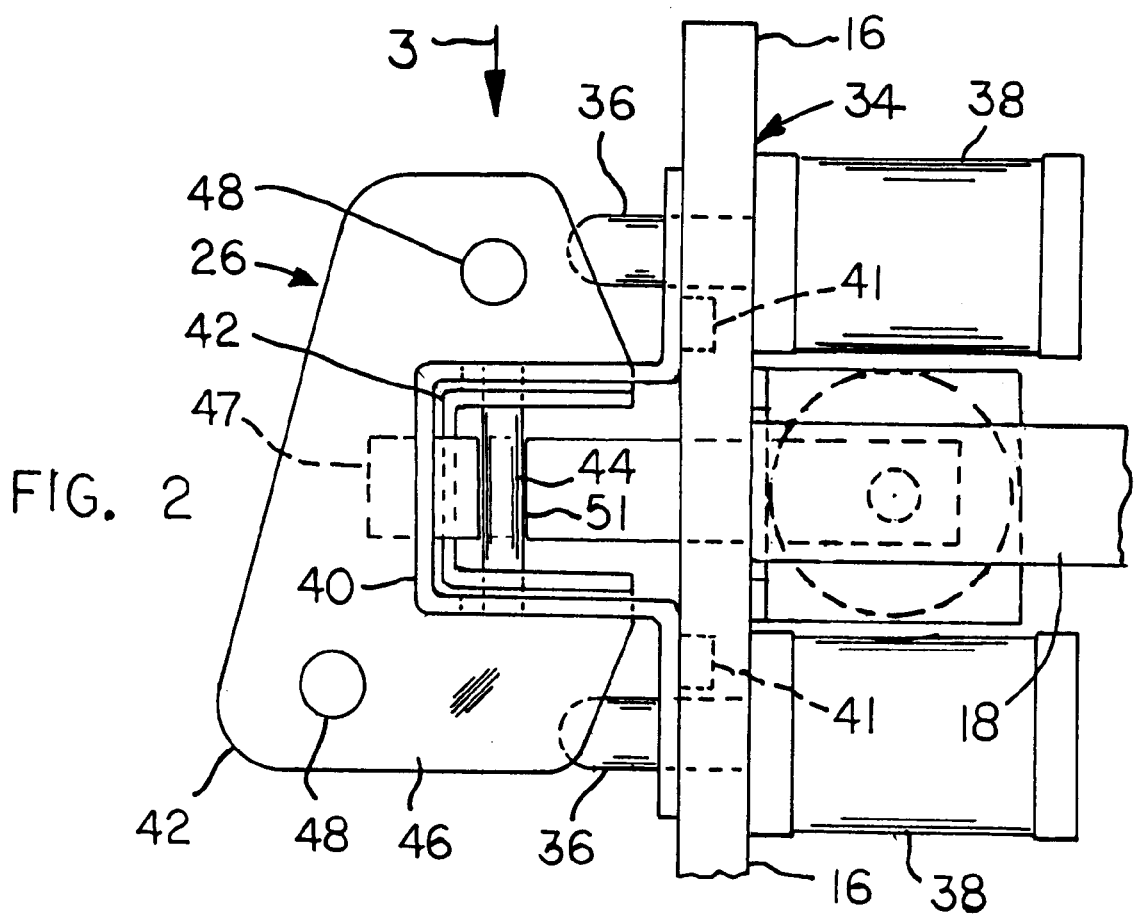
FIG. 2 is a view taken in the same direction as FIG. 1, but showing a hinge-holding mechanism enlarged.
Figure 3:
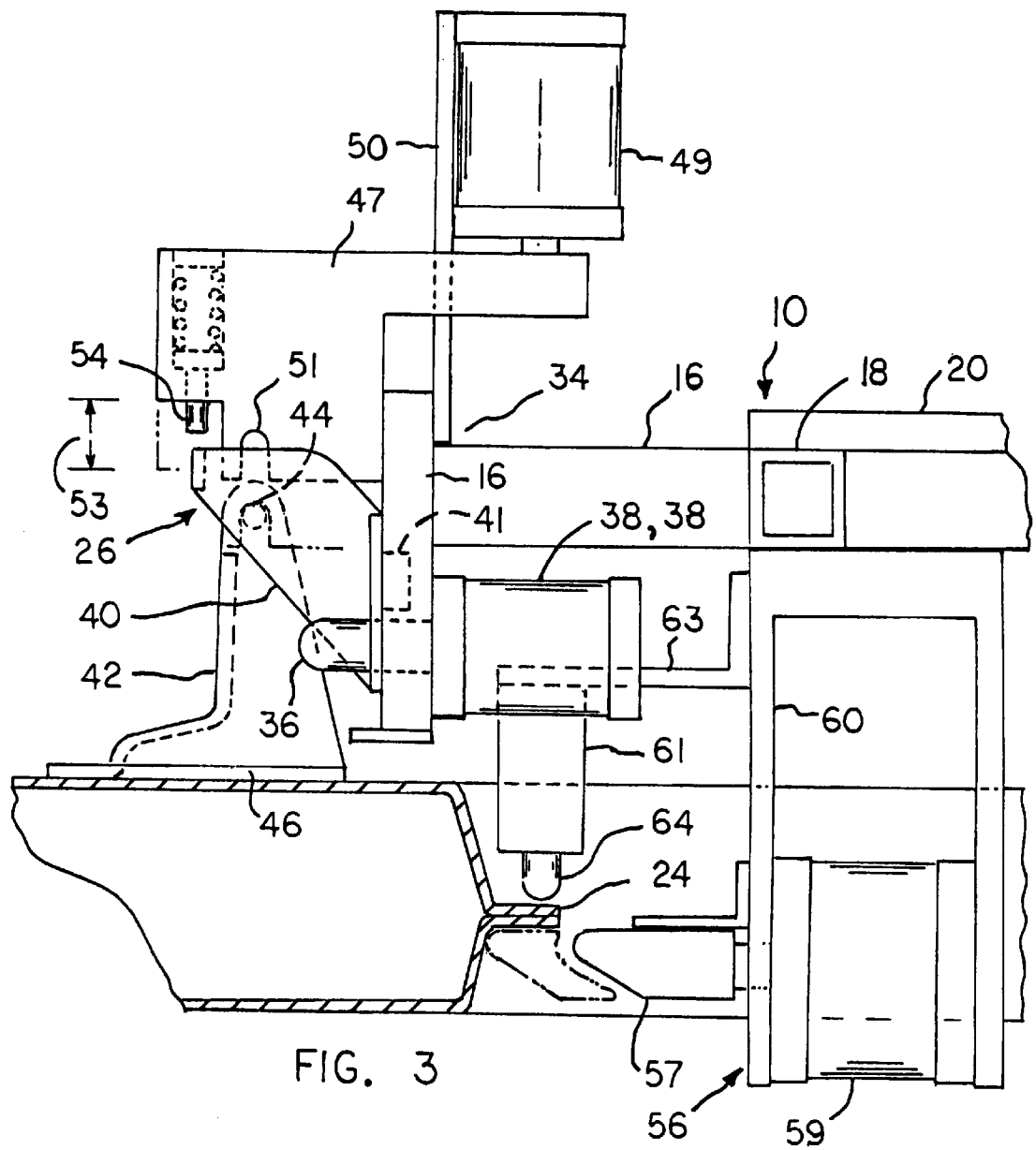
FIG. 3 is a fragmentary view taken in the direction of arrow 3 in FIG. 2.

The hinge-positioning mechanism 34 depicted in FIGS. 2 and 3 includes two cylindrical pins 36 affixed to the pistons of pneumatic cylinders 38 suitably mounted on frame 16. As shown in FIGS. 2 and 3, pins 36 are extended from frame 16 to pass through the fastener holes for the door section 40 of hinge 26. When the cylinders 38 are actuated to retract the pistons, pins 36 move into the frame 16 to free the hinge section from the frame. Each hinge is initially placed on frame 16 with pins 36 in the extended positions.

In order to ensure that hinge section 40 will remain on frame 16, two permanent magnets 41 are embedded, or otherwise attached, to the frame surface that receives the mounting flanges of the hinge door section 40. Magnets 41 act as magnetic clamps to releasably clamp hinge section 40 to frame 16. Pins 36 act as locators for hinge section 40.

Door section 40 of each hinge 26 is swingably connected to the associated auto body section 42 of the hinge by a hinge pin 44. Hinge section 42 has flanges 46 adapted to seat on the outer surface of the automobile body, as shown in FIG. 3. The hinge is secured to the auto body by bolts or rivets passed through fastener holes 48 (FIG. 2) in flanges 46. Any suitable powered fastener tool can be used to secure the hinge fasteners to the auto body.

To augment the clamping action of permanent magnets 41, there is provided a movable yoke 47 powered by a pneumatic cylinder 49. As shown in FIG. 3, cylinder 49 is mounted on a bracket 50 extending from the aluminum frame 16 (any suitable means can be used to mount the pneumatic cylinder). Yoke 47 includes a wall structure slidably supported on the left face of frame 16, whereby the yoke can slide on the frame linearly but cannot rotate around the cylinder 49 axis.

Yoke 47 has a notch (or slot) 51 adapted to partially encircle hinge pin 44 when cylinder 49 is actuated. FIG. 3 shows cylinder 49 in the retracted condition. When the cylinder is actuated (pressurized) yoke 47 advances downwardly through a stroke distance 53 (FIG. 3), whereby notch 51 partially encircles hinge pin 44. Yoke 47 prevents hinge section 40 from being displaced from its pre-located position on frame 16, especially when hinge section 42 is in the process of being fastened to the auto body. Additionally the yoke limits swinging motion of hinge section 42.

Yoke 47 is provided with a spring-biased abutment pin 54 that resiliently engages the web portion of the hinge section 40, so that the hinge assembly is indirectly brought into pressure contact with the auto body. Flanges 46 on hinges section 42 have pressure contact with the auto body surface while the hinge fasteners are being attached to the auto body. Pneumatic cylinder 49 can be actuated before or after frame 16 is manipulated to the desired position on the auto body by causing cylindrical pegs 30 to enter into the pre-formed locator holes in the auto body.

Fixture 10 is equipped with three clamping mechanisms 56 for clamping the fixture to the auto body prior to the step of fastening hinges 26 to the body. As shown in FIG. 1, one of the clamping mechanisms 56 is located on frame 16 proximate to the uppermost hinge 26. A second clamping mechanism 56 is located on frame 16 near the lowermost hinge 26. A third clamping mechanism is located on frame 16 at the opposite edge of the door opening 24 (i.e. the edge of the door opening remote from the hinges). Each clamping mechanism may be similarly constructed.

FIG. 3 shows the general construction of the clamping mechanisms. As there shown the clamp mechanism includes a slidable clamp element 57 attached to the piston of a pneumatic cylinder 59 that is suitably mounted on a bracket 60 extending from frame 16. When cylinder 59 is energized (pressurized) clamp element 57 is extended to the dashed line position behind flange 24, thereby clamping fixture 10 to the auto body (with flanges 46 of each hinge 26 in firm contact with the auto body surface).

In order to ensure that all three pneumatic cylinders 59 are energized simultaneously at the optimum time in the cycle, the three cylinders 59 are collectively controlled by three separate proximity switches suitably mounted on frame 16 near the respective cylinders 59. FIG. 3 shows one proximity switch 61 attached to frame 16, via a bracket 63, so that the sensing head 64 of the switch is located near auto body flange 24 when frame 16 is in its desired position on the auto body (as determined by cylindrical pegs 30 in FIG. 1). Each proximity switch 61 is similarly mounted.

Each proximity switch 61 is adjusted so that when the associated clamp element 57 is in a plane behind flange 24 (as shown in FIG. 3) the sensing head 64 responds to the presence of auto body flange 24 to trigger the switch to the conductive state. Switches 61,61,61 are connected electrically in series in the control circuit for the valves that supply pressurized fluid to fluid cylinders 59, such that all three switches are required to be triggered before any of the cylinders are pressurized (actuated). All three cylinders are actuated simultaneously after fixture 10 assumes its final position on the auto body (as sensed by the three proximity switches 61).

The clamping action of clamp elements 57 occurs automatically when fixture 10 reaches the desired position on the auto body, since all three proximity switches 61 have to be triggered before the cylinders 59 are pressurized. The human technician can devote attention to the process of manipulating fixture 10, without having to worry about removing one hand from a handle 32 in order to manually operate a control switch. The operation saves time and ensures that fixture 10 will be in the correct position on the auto body when clamping mechanisms 56 are actuated.

After the two hinges 26 have been fastened to the auto body a manual switch on fixture 10 can be operated to release the mechanism from the auto body. A timer controlled by the manual switch can be employed to sequentially retract each yoke 47 from the associated hinge pin 44, and to retract hinge locator pins 36 from hinge sections 40. The timer can be further cycled to depressurize the three pneumatic cylinders 59, so that the human technician can remove fixture 10 from the auto body.

The entire process, from initial placement of hinges 26 on the locator pins 36 to final separation of fixture 10 from the auto body, can be accomplished relatively quickly while the automobile body is being moved along the conveyor line.

The drawings necessarily show a specific apparatus useful in practice of the invention. However, it will be appreciated that variants can be employed while still practicing the invention.

What is claimed:

1. A mechanism for positioning a pair of door-support hinges on an automobile body adjacent to a door opening, comprising a fixture movable to a predetermined position on an automobile body;

means on said fixture for releasably locating said fixture in said predetermined position;

means on said fixture for releasably holding an upper hinge and a lower hinge while said fixture is being moved into the predetermined position on the automobile body;

means carried by said fixture for releasably clamping said fixture to the automobile body, whereby the upper and lower hinges are located on the automobile body; and means responsive to movement of said fixture to said predetermined position for automatically operating said clamping means to a clamped condition.

2. The mechanism of claim 1, wherein said clamping means comprises a powered clamping unit located on said fixture proximate to each hinge-holding means, and a third powered clamping unit located on said fixture for disposition at an edge of a door opening remote from the hinges.

3. The mechanism of claim 2, wherein said means for operating said clamping means comprises a proximity switch carried by said fixture adjacent to each powered clamping unit; said proximity switches being electrically connected to said clamping units so that the clamping units are powered to the clamped condition only when all of the proximity switches sense the presence of an automobile body in a condition to be successfully clamped by said clamping means.

4. The mechanism of claim 3, wherein each powered clamping unit comprises a slidable clamping element and an actuator for moving said clamping element between a retracted position and a clamping position on an automobile body flange bordering a door opening.

5. The mechanism of claim 1, wherein each said hinge-holding means comprises two spaced positioning pins extending from said fixture for insertion into mounting holes on a door hinge half-section, and a magnet proximate to each said pin for exerting a magnetic holding force on the hinge half-section when the hinge mounting holes are in position on said positioning pins.

6. The mechanism of claim 5, wherein each said hinge-holding means further comprises a moveable yoke means operable to partially surround the hinge pin on the associated hinge when the door hinge half-section is clamped in place on said positioning pins, and a powered actuator for moving said yoke means between a retracted position spaced from the hinge pin and an operating position partially surrounding the hinge pin.

\* \* \* \* \*

UNITED STATES PATENT AND TRADEMARK OFFICE
CERTIFICATE OF CORRECTION

PATENT NO : 6,122,819
DATED : September 26, 2000
INVENTOR(S) : Roy et al.

It is certified that error appears in the above-identified patent and that said Letters Patent are hereby corrected as shown below:

Title page :

In the Inventors [75] section, please change "Ondrio" to --Onorio--.

Signed and Sealed this

First Day of May, 2001

Attest:

NICHOLAS P. GODICI

*Attesting Officer*     *Acting Director of the United States Patent and Trademark Office*